Aug. 11, 1936.　　W. R. GREGGAINS　　2,050,944
DOUBLE LEADER BOX
Filed June 26, 1935
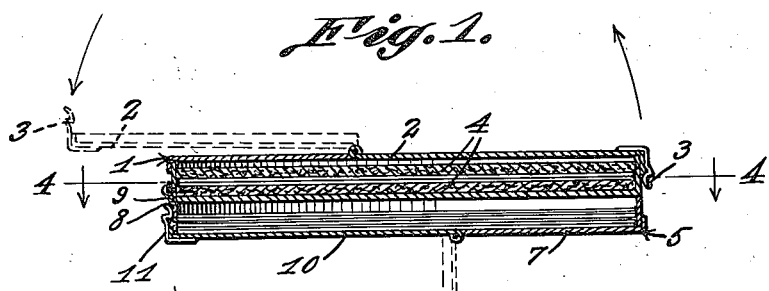
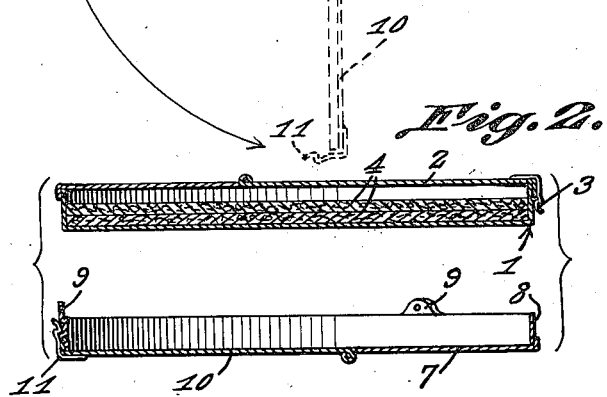
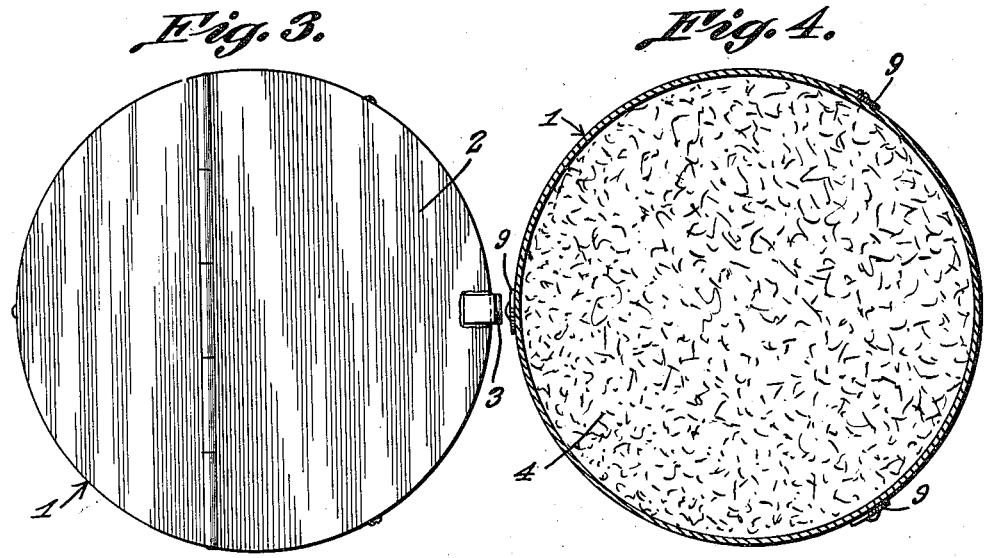
William R. Greggains, INVENTOR
BY Victor J. Evans & Co.
ATTORNEY Patented Aug. 11, 1936

2,050,944

UNITED STATES PATENT OFFICE 2,050,944

DOUBLE LEADER BOX

William R. Greggains, Lee Center, N. Y.

Application June 26, 1935, Serial No. 28,568

1 Claim. (Cl. 206—1)

This invention relates to fish line leader boxes, and has for the primary object the provision of a device of this character wherein provision is made for the treatment of leaders to render them pliable and in proper condition for use and having means for the accommodation of a supply of additional leaders easily obtainable for treatment and use when needed.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a leader box constructed in accordance with my invention.

Figure 2 is a sectional view showing the supply compartment as a separate element readily attachable to a leader box equipped with treatment facilities.

Figure 3 is a plan view illustrating the device.

Figure 4 is a sectional view taken on the line 4—4 of Figure 1.

Referring in detail to the drawing, the numeral 1 indicates a casing or box especially adapted for the treatment of fish line leaders preparatory for use and has an entrance formed in one wall closed by a hinged door 2 held in closed position by a spring catch 3. Positioned in the box or casing 1 are layers 4 of felt or any other material suitable for the purpose and which are moistened or impregnated with a suitable substance for the treatment of leaders by positioning said substance between the layers 4, as shown in Figure 1. A device of this character has no provision for the accommodation of a supply of leaders to be kept in their manufactured or original condition and to adapt a device of the character described for the accommodation of a supply of leaders, an auxiliary compartment 5 is provided by attaching to the box or casing 1 my invention which consists of a wall 7 integral with an attaching wall 8 equipped with ears 9 adapted to be riveted or otherwise secured to the casing 1 and thereby forming the compartment 5. The wall 7 has a doorway closed by a hinged door 10 held in closed position by a catch 11. The supply of leaders, as shown in Figure 1, may be readily placed in the compartment 5 and removed therefrom as needed or when it is desired to treat the leaders in the casing 1 prior to use on a fishing line. The leaders in the compartment 5 will be kept convenient, dry and in their original condition.

Having described the invention, I claim:

An attachment for a leader box of the character described for providing said box with a second box or compartment and to cause the bottom wall of the leader box to provide the inner wall of said attachment, said attachment comprising a casing having ears projecting therefrom to embrace and to be secured to the leader box and said casing having its outer wall provided with an opening, a hinged door for closing the opening and a spring catch carried by the door to frictionally engage with a wall of the casing for holding the door in normal closed position.

WILLIAM R. GREGGAINS.